(12) United States Patent
Elsom et al.

(10) Patent No.: US 8,196,423 B2
(45) Date of Patent: Jun. 12, 2012

(54) AUTOMATIC RECOVERY SYSTEM FOR FROZEN PRODUCT MACHINES

(75) Inventors: Kyle B. Elsom, Batavia, IL (US); Vincenzo DiFatta, Wood Dale, IL (US); Daniel D. Prochaska, Sr., Elgin, IL (US); Christopher Knight, Lisle, IL (US)

(73) Assignee: IMI Cornelius Inc., Glendale Heights, IL (US)

( * ) Notice: Subject to any disclaimer, the term of this patent is extended or adjusted under 35 U.S.C. 154(b) by 491 days.

(21) Appl. No.: 12/454,741

(22) Filed: May 22, 2009

(65) Prior Publication Data

US 2009/0288429 A1 Nov. 26, 2009

Related U.S. Application Data

(60) Provisional application No. 61/128,690, filed on May 23, 2008.

(51) Int. Cl.
*A23G 9/00* (2006.01)
(52) U.S. Cl. ............................... 62/342; 62/346
(58) Field of Classification Search ............... 62/68, 342, 62/346, 151, 157, 80, 234, 155, 156
See application file for complete search history.

(56) References Cited

U.S. PATENT DOCUMENTS

| 4,206,337 | A | * | 6/1980 | Marquis | 219/719 |
|---|---|---|---|---|---|
| 4,429,549 | A | * | 2/1984 | Randolphi | 62/342 |
| 4,510,765 | A | * | 4/1985 | Rossi | 62/154 |
| 4,840,040 | A | * | 6/1989 | Fung | 62/255 |
| 5,095,710 | A | * | 3/1992 | Black et al. | 62/68 |
| 5,158,506 | A | * | 10/1992 | Kusano et al. | 62/136 |
| 5,212,954 | A | * | 5/1993 | Black et al. | 62/73 |
| 5,463,878 | A | * | 11/1995 | Parekh et al. | 62/394 |
| 5,706,661 | A | * | 1/1998 | Frank | 62/70 |
| 6,513,578 | B2 | * | 2/2003 | Frank | 165/63 |
| 6,679,314 | B2 | * | 1/2004 | Frank | 165/63 |
| 2002/0033021 | A1 | * | 3/2002 | Frank | 62/68 |

* cited by examiner

*Primary Examiner* — Mohammad Ali
(74) *Attorney, Agent, or Firm* — Pyle & Piontek, LLC

(57) ABSTRACT

A recovery system for a frozen product dispenser accommodates automatic recovery and continued operation of the dispenser in response to the output torque of a beater bar and scraper assembly drive motor exceeding a selected upper limit due to transient conditions. A controller monitors the output torque of the drive motor and, upon sensing an output torque in excess of the selected upper limit, shuts off the drive motor and operates a refrigeration system to defrost a freeze barrel within which the beater bar and scraper assembly is rotated, for a time sufficient to defrost product in the barrel. The controller then turns on the drive motor, operates the refrigeration system to refreeze product in the barrel and continues to monitor the output torque of the drive motor. The foregoing operation is repeated several times, if and as necessary, before a system error is generated.

18 Claims, 6 Drawing Sheets

AUTOMATIC RECOVERY SYSTEM FOR FROZEN PRODUCT MACHINES

This application claims benefit of provisional patent application Ser. No. 61/128,690, filed May 23, 2008.

FIELD OF THE INVENTION

The present invention relates to frozen product machine that utilize motor driven beater bar and scraper assemblies for product freeze barrels, and in particular to a system for controlling operation of a frozen product machine upon sensing that an upper torque limit of a drive motor for a beater bar and scraper assembly of its freeze barrel has been exceeded.

BACKGROUND OF THE INVENTION

Frozen product machines, such as frozen carbonated beverage (FCB) machines, utilize a freeze cylinder or freeze barrel for producing a slush beverage product. In operation of the frozen product machine, relatively warm liquid beverage product components, such as syrup and a diluent for the syrup, are delivered into the freeze barrel in a predetermined ratio. The freeze barrel is heat exchange coupled to a chilling means, such as an evaporator coil that is wrapped around the exterior of the barrel and chilled by a refrigeration system, to cool and reduce the temperature of the product mix in the barrel to below its freeze point. A beater bar and scraper assembly, powered by an electric drive motor, is within the barrel and is rotated to scrape frozen product from the inner wall of the freeze barrel and to mix it with liquid product in the barrel to form a slurry mixture of frozen beverage product for service to customers. The output torque of the motor, that is required for the motor to rotate the beater bar and scraper assembly at a nominal speed, is generally proportional to the viscosity of the product in the barrel and, therefore, to the amount of ice present in the barrel. The power draw of the motor is generally proportional to the output torque of the motor, and is sensed by a controller, usually by sensing the current or amperage draw of the motor. The controller uses the sensed power draw of the motor, which is representative of the viscosity of beverage product in the barrel and the state to which the beverage product is frozen, to operate the refrigeration system in a manner to control the consistency of product in the freeze barrel, usually by turning the refrigeration system on and off.

Drive motor systems employed to rotate beater bar and scraper assemblies in freeze barrels have upper maximum torque limits that often are not significantly greater than the torque output of the motor that is required to rotate the beater bar and scraper assembly in the preparation of relatively thick frozen beverage products. During normal operation of a frozen product dispenser, the torque output of the motor that is required to scrape ice and agitate product in a freeze barrel is below, but not significantly below, the upper torque limit of the motor. However, interim conditions can and do develop that produce torque requirements in excess of the upper limit. For example, when the refrigeration system turns off, it can happen that sufficient liquid refrigerant remains in the barrel evaporator that, as it boils off, chills the barrel to a point where product in it becomes sufficiently viscous to cause an overtorque condition of the drive motor for the beater bar and scraper assembly in the barrel, in which case the output torque of the drive motor exceeds its upper limit. In typical applications, this excess torque condition is sensed by the controller, which then shuts down the drive motor and refrigeration system in order to prevent damage to the drive motor. Conventionally, this shut down of the drive motor and refrigeration requires that a service call be made to reset the frozen product dispenser error condition and correct the cause of the excess torque.

It often happens that the condition resulting in an excess torque output of the beater bar and scraper assembly drive motor is transient as can occur, for example, in response to a temporary fluctuation in the mixture of product in the barrel, which fluctuation can affect the freeze point of the product and the amount of slush ice produced in the barrel and, thereby, the torque output of the motor. Nevertheless, even though the condition causing an excess torque output of the motor is transient, the system will shut down in an error condition and a service call will be required.

OBJECT OF THE INVENTION

A primary object of the present invention is to provide a control system for operating an electric motor driven beater bar and scraper assembly for a freeze barrel of a frozen product dispenser, which provides for automatic recovery of the drive motor system and operation of the frozen product dispenser in response to occurrence of an excess output torque the motor due to transient conditions.

SUMMARY OF THE INVENTION

In accordance with the present invention, a frozen product machine comprises a freeze barrel; a refrigeration system operable in a chilling cycle to freeze product in the freeze barrel and in a defrost cycle to defrost product in the freeze barrel; a scraper in the freeze barrel; and an electric motor for rotating the scraper in the freeze barrel. Also included are means for sensing the output torque of the motor; means, responsive to the sensing means sensing an output torque of the motor at least equal to a selected limit, for turning off the motor and operating the refrigeration system in a defrost cycle to defrost product in the freeze barrel; and means, responsive to completion of the defrost cycle of the refrigeration system, for turning on the motor and operating the refrigeration system in a chilling cycle to refreeze product in the freeze barrel.

The means responsive to the sensing means is responsive to the sensing means sensing an output torque of the motor at least equal to the selected limit for a selected time to turn off the motor and operate the refrigeration system in a defrost cycle. Also, the means responsive to completion of the defrost cycle of the refrigeration system is responsive to the refrigeration system operating in a defrost cycle for a predetermined time to turn on the motor and operate the refrigeration system in a chilling cycle. Advantageously, included is means responsive to the sensing means sensing the output torque of the motor being at least equal to the selected limit a determined number of times for turning off the frozen product machine.

In a preferred embodiment, the frozen product machine comprises a freeze barrel; a refrigeration system operable in a chilling cycle to freeze product in the freeze barrel and in a defrost cycle to defrost product in the freeze barrel; a scraper in the freeze barrel; an electric motor for rotating the scraper in the freeze barrel; means for sensing the output torque of the motor and for comparing the sensed torque to an upper torque limit; and means responsive to the sensed torque being at least equal to the upper torque limit for at least a selected time to turn off the motor and operate the refrigeration system in a defrost cycle of the freeze barrel. Also included is means responsive to the refrigeration system being operated in a defrost cycle of the freeze barrel for a predetermined time to turn on the motor and operate the refrigeration system in a chilling cycle of the freeze barrel.

The means for sensing the output torque of the electric motor includes means for sensing the electrical power input to the motor, which can comprise means for sensing the current draw of the motor. In addition, it is contemplated that the means for sensing the output torque of the electric motor include means for periodically sensing the output torque; and that the means responsive to the sensed motor output torque being at least equal to the upper torque limit for at least a selected time be responsive to the sensed torque being at least equal to the upper torque limit at each periodic sensing of the output torque for the selected time to turn off the motor and operate the refrigeration system in a defrost cycle of the freeze barrel. Advantageously included are counter means for counting the number of occurrences of the sensed torque being at least equal to the upper torque limit for at least a selected time, and means responsive to the counter means reaching a determined count for turning off the frozen product machine.

The invention also provides a method of operating a frozen product dispenser having a refrigeration system operable in chilling and defrost cycles to respectively freeze and defrost product in a freeze barrel, a scraper in the freeze barrel, and an electric motor for rotating the scraper in the freeze barrel. The method comprises the steps of sensing the output torque of the electric motor; in response to the sensing step sensing an output torque of the motor that is at least equal to a selected limit, turning off the motor and operating the refrigeration system in a defrost cycle to defrost product in the freeze barrel; and upon completion of the defrost cycle, turning on the motor and operating the refrigeration system in a chilling cycle to refreeze product in the freeze barrel.

The step of turning off the motor and operating the refrigeration system in a defrost cycle may be responsive to the sensing step sensing an output torque of the motor that is at least equal to the selected limit for a selected time to turn off the motor and operate the refrigeration system in a defrost cycle. Also, the step of turning on the motor and operating the refrigeration system in a chilling cycle upon completion of the defrost cycle may be responsive to occurrence of the defrost cycle for at least a predetermined time to turn on the motor and operate the refrigeration system in a chilling cycle. Advantageously included is the step of turning off the frozen product machine in responsive to the sensing step sensing an output torque of the motor that is at least equal to the selected limit a determined number of times.

In a contemplated method of operating a frozen product dispenser having a refrigeration system operable in chilling and defrost cycles to respectively freeze and defrost product in a freeze barrel, a scraper in the freeze barrel, and an electric motor for rotating the scraper in the freeze barrel, included are the steps of sensing the output torque of the electric motor; comparing the sensed motor output torque to an upper torque limit; determining whether the sensed motor output torque is at least equal to the upper torque limit for at least a selected time; turning off the electric motor and operating the refrigeration system in a defrost cycle of the freeze barrel upon determining that the sensed motor output torque is at least equal to the upper torque limit for at least the selected time; and turning on the electric motor and operating the refrigeration system in a chilling cycle of the freeze barrel upon the refrigeration system being operated in a defrost cycle of the freeze barrel for a predetermined time.

The step of sensing the output torque of the electric motor can include the step of sensing the electrical power input to the motor, which can comprise sensing the current draw of the motor. In addition, it is contemplated that the sensing and comparing steps be performed periodically; and that the step of determining whether the sensed motor output torque is at least equal to the upper torque limit for at least the selected time be responsive to the motor output torque being at least equal to the upper torque limit at each periodic performance of the sensing and comparing steps for the selected time to turn off the motor and operate the refrigeration system in a defrost cycle of the freeze barrel. Advantageously included are the steps of counting the number of performances of the determining step determining that the sensed motor output torque is at least equal to the upper torque limit for at least the selected time; and turning off the frozen product machine in response to the counting step reaching a determined count.

The foregoing and other objects advantages and features of the invention will become apparent upon a consideration of the following detailed description when taken in conjunction with the accompanying drawings.

DETAILED DESCRIPTION

The invention provides a novel system for automatically restoring operation of a frozen product dispenser following occurrence a selected limited number of transient occasions during which an electric drive motor for a beater bar and scraper assembly of a freeze barrel of the dispenser exceeds an upper torque limit In particular, the system of the invention enables a frozen product dispenser to automatically be restored to operation following a transient occurrence in which a maximum torque output of the drive motor is exceeded, which excess torque output would otherwise cause the dispenser to be shut down and remain out of service until a service call is be made by a repair technician to fix the dispenser and reset the error condition. In general, if an excess torque condition is detected, the automatic recovery system controls a refrigeration system of the dispenser to stop chilling the barrel, if it is then in a chilling cycle, and to immediately initiate a defrost cycle of the barrel by flowing hot refrigerant gas through an evaporator that is heat exchange coupled to the barrel in order to melt frozen product in the barrel. The refrigeration system is maintained in the defrost cycle for a predetermined time period that is sufficient for excess frozen product in the barrel to be melted, thereby eliminating the condition of excess torque output of the drive motor by decreasing the load on the motor. Once the predetermined defrost time has lapsed, the system returns to normal operation and the refrigeration system is operated to chill and freeze product in the barrel. The torque output of the drive motor continues to be monitored, and if the excess torque condition remains or is again detected during the chilling cycle of the barrel, the system again initiates a defrost cycle for the predetermined time period, following which the freeze cycle is again initiated until normal torque levels are restored. The system will go through the foregoing sequence of defrosting and chilling the freeze barrel a predetermined number of times upon continuing to detect an excess torque condition of the drive motor, before an error is declared and the frozen product dispenser is shut down pending a service call. In most cases the condition that produced the excess drive motor torque condition will cease to exist following defrost of the barrel, and normal operation of the machine will be restored without loss of operation of the dispenser as is otherwise typical in conventional frozen beverage machines.

Figure 1:
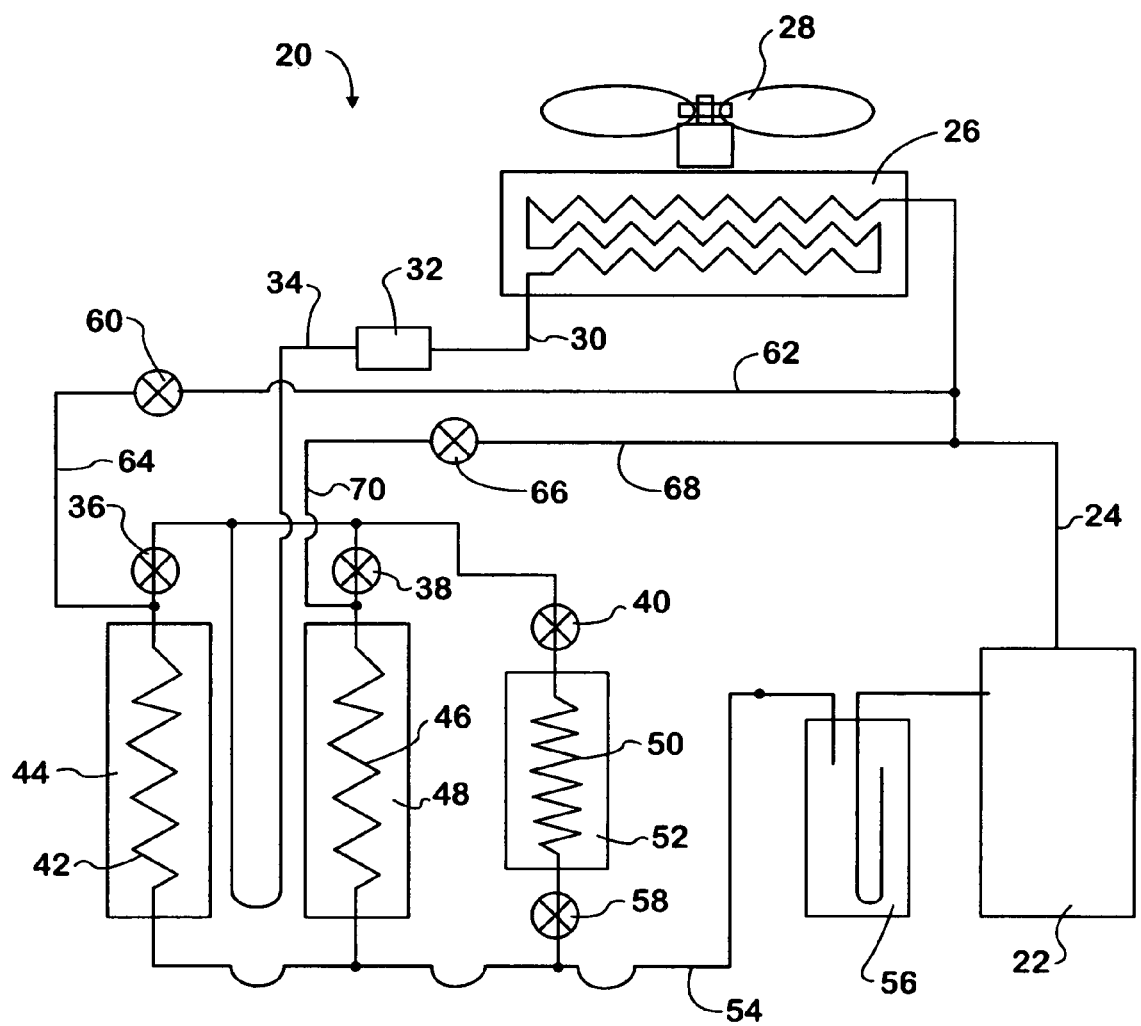
FIG. 1 is a schematic representation of a refrigeration system of a type that may be used to chill each of two beverage product freeze barrels and a beverage product pre-chiller of a frozen beverage product dispenser.

Referring to FIG. 1, a refrigeration system as may be used with a frozen product dispenser is indicated generally at 20. The refrigeration system may advantageously be of a type used in practice of a prescriptive refrigerant flow control as disclosed in co-pending application Ser. No. 11/974,061, filed Oct. 11, 2007, the teachings of which are incorporated herein by reference. The refrigeration system includes a variable speed/capacity compressor 22, which may be a scroll or a reciprocating compressor in which an ac motor of the compressor is powered by an ac voltage having a frequency controlled to provide a desired speed of operation of the motor and, thereby, a desired output capacity of the compressor. Alternatively, for the purposes of the present invention, the compressor can be a single speed compressor. In either case, hot refrigerant at an outlet from the compressor is delivered through a refrigerant line 24 to an inlet to a condenser 26 through which air is drawn by a fan 28 to cool the refrigerant. Cooled refrigerant at an outlet from the condenser flows through a refrigerant line 30 to and through a filter/dryer 32 and a refrigerant line 34 to inlets to each of three electronically controlled expansion valves 36, 38 and 40, which may be of the stepper motor driven or pulse valve modulated type, such that the expansion valves may be controlled to meter selected refrigerant flows. Refrigerant exiting an outlet from the expansion valve 36 is delivered to an inlet to an evaporator coil 42 that is heat transfer coupled to a first beverage product freeze barrel 44 of a frozen carbonated beverage (FCB) dispenser to chill the barrel and freeze beverage product in the barrel. Refrigerant exiting an outlet from the expansion valve 38 is delivered to an inlet to an evaporator coil 46 that is heat transfer coupled to a second beverage product freeze barrel 48 of the dispenser to chill the barrel and freeze beverage product in the barrel. Refrigerant exiting an outlet from the expansion valve 40 is delivered to an inlet to an evaporator coil 50 that is heat transfer coupled to a pre-chiller 52 of the dispenser to chill the pre-chiller and, as will be described, to chill beverage product flowed through the pre-chiller before being introduced into the freeze barrels 44 and 48. After passing through each of the freeze barrel evaporators 42 and 46, refrigerant exiting the evaporators flows through a refrigerant line 54 and an accumulator 56 to ah inlet to the compressor 22. After passing through the pre-chiller evaporator 50, refrigerant exiting the evaporator flows through an evaporator pressure regulating valve 58 and then through the refrigerant line 54 and accumulator 56 to the inlet to the compressor. The evaporator pressure regulating valve 58 serves to prevent the pressure of refrigerant in the evaporator 50 from falling below a lower limit, thereby to prevent freezing of beverage product in the pre-chiller 52.

The refrigeration system 20 has two defrost circuits, a first one of which is for defrosting the freeze barrel 44 and includes a solenoid operated refrigerant valve 60 having an inlet coupled directly to hot refrigerant at the outlet from the compressor 22 through a refrigerant line 62 and an outlet coupled to the inlet to the freeze barrel evaporator 42 through a refrigerant line 64. A second defrost circuit is for defrosting the freeze barrel 48 and includes a solenoid operated refrigerant valve 66 having an inlet coupled directly to hot refrigerant at the outlet from the compressor 22 through a refrigerant line 68 and an outlet coupled to the inlet to the freeze barrel evaporator 46 through a refrigerant line 70. The defrost circuits are operated to heat the evaporators 42 and 46 to defrost the beverage product barrels 44 and 48 in defrost cycles of the refrigeration system. When the refrigeration system is operating to chill the product freeze barrel 44, the refrigerant valve 60 is closed and the expansion valve 36 is open, and when the refrigeration system is operated in a defrost mode to defrost product in the freeze barrel 44, the refrigerant valve 60 is open and the expansion valve 36 is closed. Similarly, when the refrigeration system is operating to chill the product freeze barrel 48, the refrigerant valve 66 is closed and the expansion valve 38 is open, and when the refrigeration system is operated in a defrost mode to defrost product in the freeze barrel 48, the refrigerant valve 66 is open and the expansion valve 38 is closed.

Figure 2:
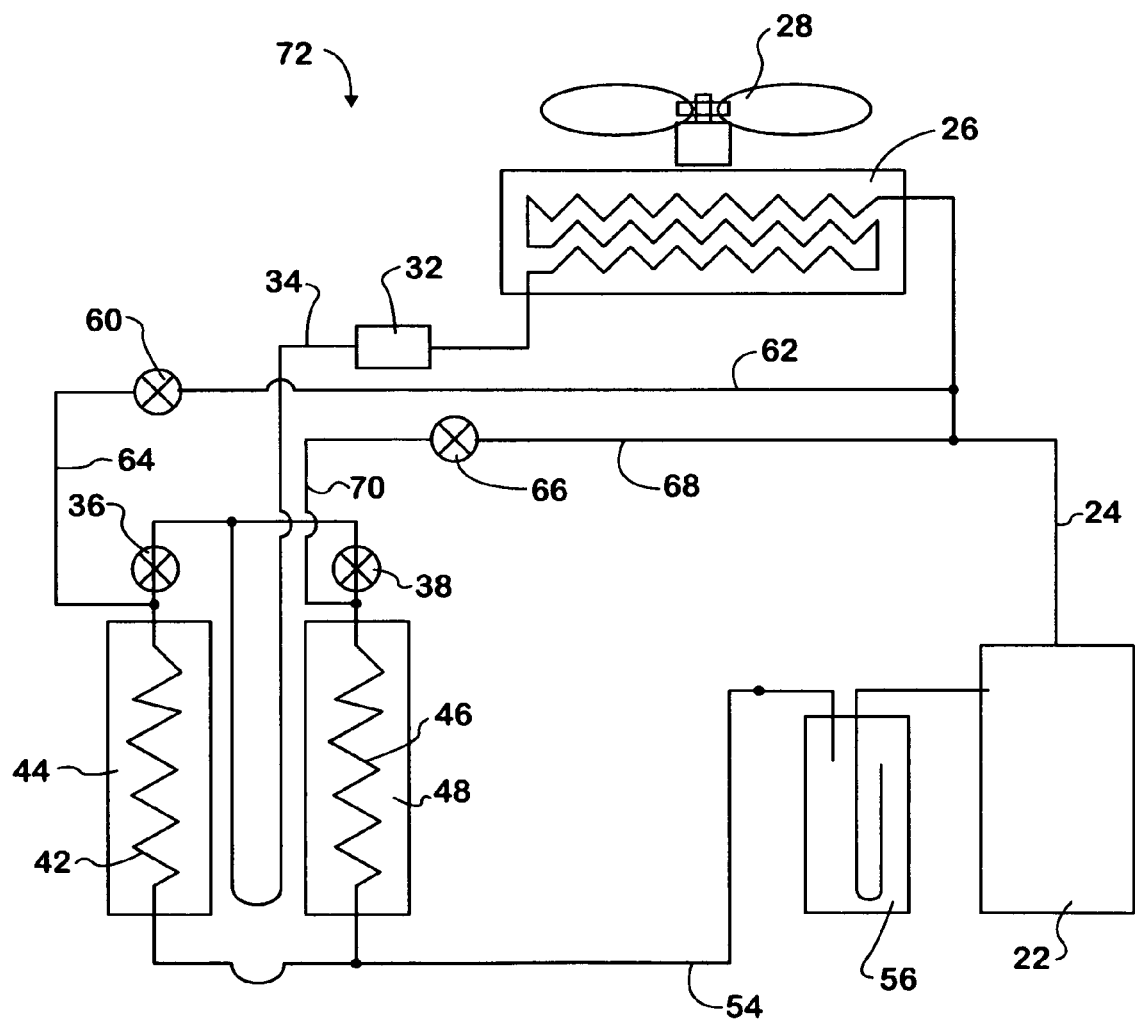
FIG. 2 is similar to FIG. 1, except that the refrigeration system does not provide chilling for a pre-chiller.

The refrigeration system 20 is adapted for use with an FCB dispenser that has a pre-chiller 52. To provide chilling for an FCB dispenser that does not have a pre-chiller, a refrigeration system of a type shown in FIG. 2 and indicated generally at 72 may be used. The refrigeration system 72 is similar to the refrigeration system 20, and like reference numerals have been used to denote like components. A difference between the two systems is that since the system 72 does not provide for cooling of a pre-chiller 52, it does not have an evaporator coil 50, an electronically controlled expansion valve 40 and an evaporator pressure regulating valve 58. Otherwise, the structure and operation of the two refrigeration systems 20 and 72 are similar.

While each of the refrigeration systems 20 and 72 are structured to provide chilling for two product freeze barrels, since that enables two different types or flavors of frozen beverage products to be prepared by a frozen beverage product machine, the teachings of the invention may also be used with a frozen beverage machine that has only a single product freeze barrel, or with one that has more than two product freeze barrels. As is understood, each freeze barrel has its own electric motor driven beater bar and scraper assembly, and the number of freeze barrels of a machine determines the number of motor driven beater bar and scraper assemblies embodied in the machine.

Figure 3:
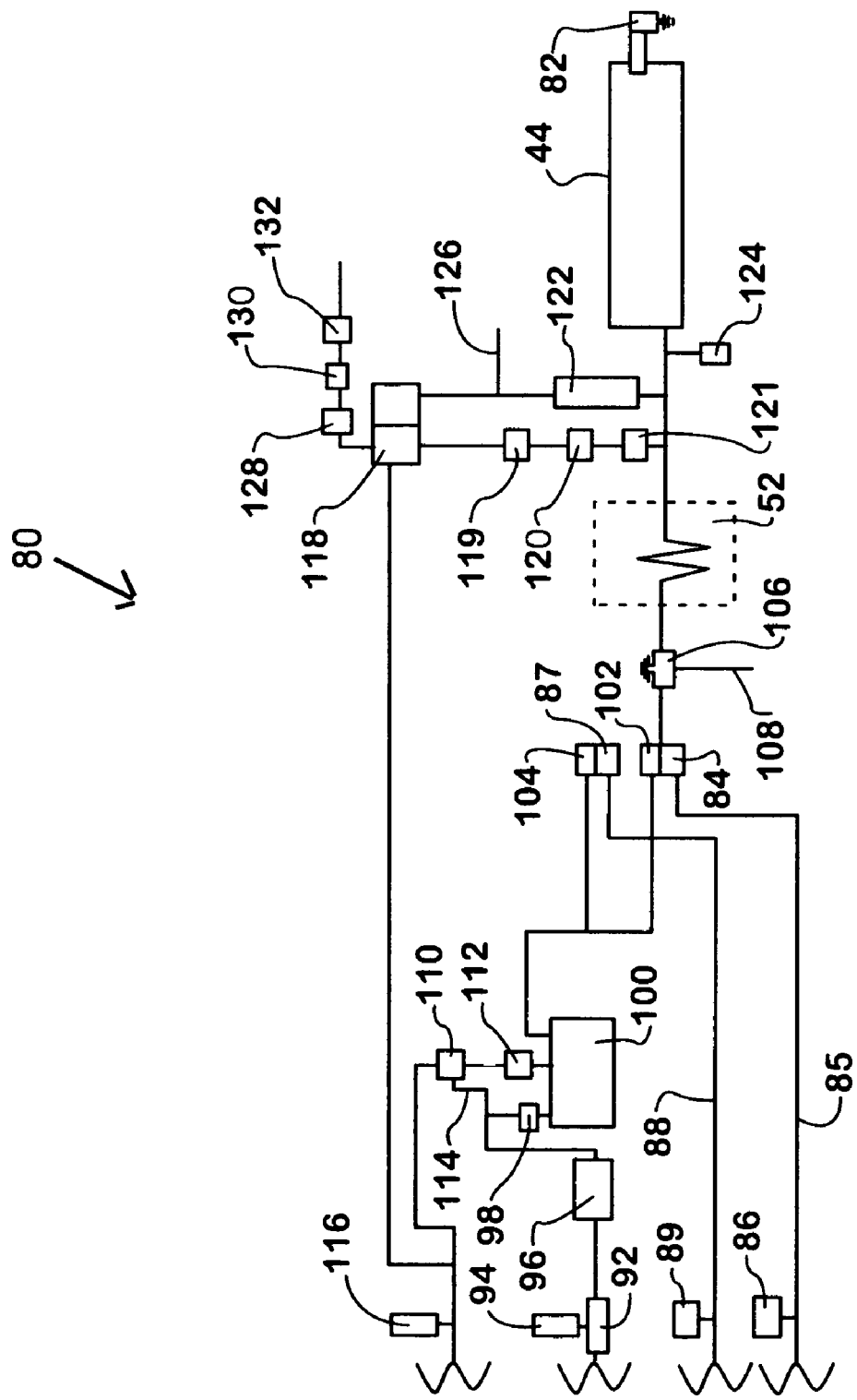
FIG. 3 is a schematic representation of one possible type of frozen beverage product dispensing system having two beverage product freeze barrels and a pre-chiller that are chilled by the refrigeration system of FIG. 1, with which the beater bar and scraper assembly drive motor control system of the invention may advantageously be used.

One arrangement of FCB dispenser that may utilize the refrigeration system 20 and with which the automatic recovery system of the invention may be used is shown in FIG. 3 and indicated generally at 80. The dispenser includes the two beverage product freeze barrels 44 and 48, only the barrel 44 being shown. This particular embodiment of FCB dispenser utilizes ambient temperature carbonation, and while not specifically shown in FIG. 3 (but shown in FIG. 1), it is understood that the evaporator coil 42 is heat transfer coupled to the barrel 44 to chill the barrel in order to freeze beverage product mixture delivered into the barrel. With reference to the portion of the dispenser 80 shown and associated with the freeze barrel 44, it being understood that a like description applies to a similar but less than fully shown portion of the dispenser associated with the freeze barrel 48, a frozen beverage product dispensing valve 82 is provided on the barrel 44 for service of frozen beverage product to customers. To deliver liquid beverage components into the barrel for being frozen, an externally pumped beverage syrup concentrate is delivered to an inlet to a syrup brixing valve 84 through a syrup line 85, to which line is coupled a sensor 86 for detecting a syrup-out condition. To deliver liquid beverage components to the barrel 48 (shown in FIG. 1), an externally pumped beverage syrup is delivered to an inlet to a syrup brixing valve 87 through a syrup line 88, to which line is coupled a sensor 89 for detecting a syrup-out condition. A potable water supply, such as from a city main, is connected to the dispenser through a strainer/pressure regulator 92, to which is coupled a pressure switch 94 for detecting a water-out condition. From the strainer/pressure regulator the water passes through a carbonator pump 96 and a check valve 98 to a water inlet to a carbonator 100. The carbonator 100 operates in a manner well understood in the art to carbonate water introduced therein, and carbonated water at an outlet from the carbonator is delivered to each of an inlet to a water brixing valve 102 associated with the syrup brixing valve 84 and to an inlet to a water brixing valve 104 associated with the syrup brixing valve 87. The brixing valves 104, 87 comprise an associated pair of brixing valves that delivers a water and syrup mixture, in a selected and adjustable ratio, through an associated fluid circuit (not shown) that includes the pre-chiller 52 and to the freeze barrel 48. The brixing valves 102, 84 also comprise an associated pair of brixing valves that delivers a water and syrup mixture, in a selected and adjustable ratio, through an associated fluid circuit that includes the pre-chiller 52 and to the freeze barrel 44. The water and syrup beverage mixture provided at an outlet from each pair of brixing valves is in a ratio determined by the settings of the individual valves of each pair, and the mixture passed though the brixing valves 102, 84 is delivered through a 3-way valve 106 and the pre-chiller 52 to the freeze cylinder or barrel 44, it being understood that, although not shown (but shown in FIG. 1), the evaporator coil 50 is heat exchange coupled to the pre-chiller. The 3-way valve 106 has an outlet 108 leading to atmosphere, by means of which a sample of the water and syrup mixture output by the pair of brixing valves 102 and 84 may be collected for analysis, so that any necessary adjustments may be made to the brixing valves to provide a desired water/syrup ratio.

To carbonate water in the carbonator tank 100, an externally regulated supply of $CO_2$ is coupled through a temperature compensated pressure regulator 110 and a check valve 112 to the carbonator, the regulator 110 including a capillary sensor 114 for detecting the temperature of incoming water. A sensor 116 detects a $CO_2$-out condition, and the supply of $CO_2$ is also coupled to inlets to each of two $CO_2$ pressure regulators of a manifold 118. An outlet from a first one of the manifold pressure regulators is coupled through a solenoid shut-off valve 119, a $CO_2$ flow control valve 120 and a $CO_2$ check valve 121 to an inlet to the freeze barrel 44. In addition, $CO_2$ at an outlet from a second one of the manifold pressure regulators is coupled to an upper opening to an expansion tank 122, a lower opening to which is coupled to the water and syrup mixture line between the pre-chiller and freeze barrel. The flow control valve 120 accommodates adjustment of the carbonation level in the barrel 44 by enabling the introduction of $CO_2$ into the barrel for a brief period before a mixture of water and syrup is delivered into the barrel. A pressure transducer 124 monitors the pressure of the water and syrup mixture in the barrel 44 and serves as a pressure cut-in/cut-out sensor to control filling and refilling of the barrel with liquid beverage product to be frozen in the barrel. As is understood by those skilled in the art, when the pressure transducer 124 detects a lower limit cut-in pressure in the barrel, for example 23 psi, the pair of brixing valves 102, 84 is opened for delivery of a water and syrup mixture to and into the barrel to refill the barrel, until the pressure transducer detects an upper limit cut-out pressure, for example 29 psi, whereupon the pair of brixing valves is closed. During flow of the water and syrup mixture to the barrel, the mixture is cooled as it flows through an associated circuit in the pre-chiller 52. As the beverage mixture is frozen in the barrel 44 it expands, and the expansion chamber 122 accommodates such expansion.

As mentioned, the dispenser 80 includes the freeze barrel 48 and, therefore, includes further structure (not shown) that is generally duplicative of that to the right of the pair of brixing valves 102, 84 and that accommodates delivery of a water and syrup mixture from the pair of brixing valves 104, 87 to the barrel 48, except that the beverage mixture does not flow through a separate pre-chiller, but instead flows through an associated circuit of the prechiller 52. In addition, a line 126 delivers $CO_2$ to an upper opening to an expansion chamber, a lower opening from which couples to an inlet to the barrel 48, and to accommodate addition of $CO_2$ to the barrel 48, the outlet from the manifold first $CO_2$ pressure regulator is also coupled through a solenoid shut-off valve 128, a $CO_2$ flow control valve 130 and a $CO_2$ check valve 132 to the inlet to the barrel.

In operation of the FCB machine 80, liquid beverage components are introduced through the pre chiller and into the freeze barrels 44 and 48 by their respective pairs of brixing valves 84, 102 and 87, 104. The refrigeration system 20 provides chilling for the pre-chiller 52 via the heat transfer coupled evaporator 50, so that the liquid beverage components delivered into the freeze barrels 44 and 48 are chilled. The refrigeration system also provides chilling for the freeze barrels 44 and 48 via the respective heat transfer coupled evaporators 42 and 46, to freeze the liquid beverage components in the barrels while the components are agitated by associated motor driven beater bar and scraper assemblies, all in a manner understood by those skilled in the art. Frozen beverage product prepared within the freeze barrels is dispensed for service to customers, such a by the dispense valve 82 coupled to the freeze barrel 44.

Figure 4:
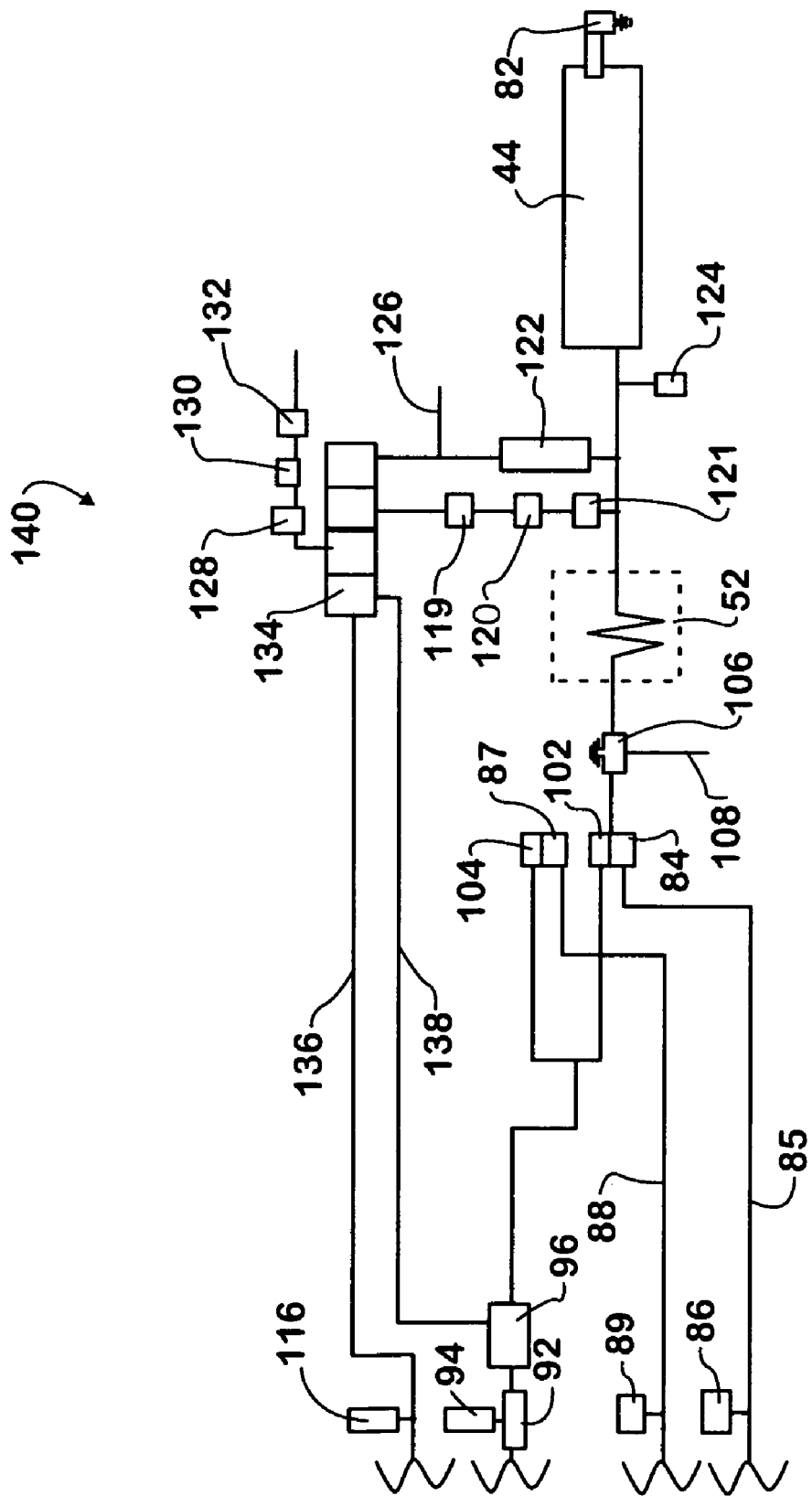
FIG. 4 is a schematic representation of a frozen product dispensing system utilizing chilled carbonation, which also is of a type with which the beater bar and scraper assembly drive motor control system of the invention may advantageously be used.

Another type of FCB dispenser with which the refrigeration system 20 may be used is shown in FIG. 4 and indicated generally at 140. The dispenser 140 is somewhat similar to the FCB dispenser 80 of FIG. 3, except that it utilizes chilled carbonation, and like reference numerals have been used to denote like components. With reference to the portion of the FCB dispenser 140 associated with the freeze barrel 44, it being understood that a similar description would apply to a similar, but only partially shown, structure of the dispenser associated with the freeze barrel 48, the frozen beverage product dispensing valve 82 is coupled to the barrel 44 for service of frozen beverages to customers. To deliver liquid beverage components to the barrel 44 for being frozen in the barrel, an externally pumped beverage syrup concentrate is delivered to the syrup brixing valve 84 through the syrup line 85, to which is coupled the sensor 86 that detects a syrup-out condition. To deliver beverage components to the barrel 48, an externally pumped beverage syrup concentrate is delivered to the inlet to the syrup brixing valve 87 through the syrup line 88, to which is coupled the sensor 89 for detecting a syrup-out condition. A potable water supply connects to the dispenser through a strainer/pressure regulator 92, to which is coupled a pressure switch 94 for detecting a water-out condition. The outlet from the strainer/pressure regulator 92 is coupled to an inlet to a $CO_2$ driven water pump 96. Unlike the FCB dispenser 80 of FIG. 3, in which the outlet from the water pump is connected to an inlet to an ambient temperature carbonator 100, in the FCB dispenser 140 an outlet from the water pump 96 is fluid coupled directly to the inlet to each of the water brixing valve 102 associated with the syrup valve 84 and the water brixing valve 104 associated with the syrup valve 87. The brixing valves 104, 87 deliver a water/syrup mixture in a selected ratio, determined by the settings of the valves, to the freeze barrel 48 through an associated fluid circuit (not shown) that includes the pre-chiller 52, and the brixing valves 102, 84 deliver a water/syrup mixture in a selected ratio, determined by the settings of the valves, to an inlet to the freeze barrel 44 through the pre-chiller. The water/syrup mixture delivered from the brixing valves 102, 84 flows through the 3-way valve 106 and the pre-chiller 52 to the inlet to the barrel 44, with the outlet 108 from the valve 106 providing the means by which a sample of the water/syrup mixture may be collected for analysis.

An externally regulated supply of $CO_2$ is coupled through a line 136 to inlets to each of four $CO_2$ pressure regulators of a manifold 134, to which line is coupled the sensor 116 for detecting a $CO_2$-out condition. An outlet from a first one of the manifold pressure regulators is coupled through a line 138 to the $CO_2$ driven water pump 96 to operate the pump. An outlet from a second one of the manifold $CO_2$ pressure regulators is coupled through the solenoid shut-off valve 119, the $CO_2$ orifice 120 and the $CO_2$ check valve 121 to the chilled water/syrup mixture flowing from the pre-chiller 52 to the inlet to the freeze barrel 44, thereby to selectively carbonate the chilled beverage mixture in accordance with the solenoid shut-off valve 119 being open or closed and the setting of the manifold second $CO_2$ pressure regulator, whereby either carbonated or non-carbonated beverages may selectively be frozen in the barrel 44. An outlet from a third one of the manifold $CO_2$ pressure regulators is coupled to the upper opening to the expansion tank 122, the lower opening to which is coupled to the water/syrup mixture line extending between the outlet from the pre-chiller 52 and inlet to the freeze barrel 44. For service of frozen carbonated beverages, the manifold second $CO_2$ pressure regulator accommodates adjustment of the carbonation level in the barrel 44 by enabling the introduction of $CO_2$ into the barrel for a brief period before a mixture of water and syrup is delivered into the barrel. The pressure transducer 124 monitors the pressure of the beverage mixture introduced into the barrel and, as is understood by those skilled in the art, when the pressure transducer detects a selected lower cut-in pressure in the barrel 44, for example 23 psi, the brixing valves 102, 84 are opened for delivery of a water/syrup beverage mixture to the barrel, until the pressure transducer detects an upper cut-out pressure in the barrel, for example 29 psi, in response to which the brixing valves are closed. As the water and syrup mixture freezes in the barrel 44, it expands and backs up into the expansion chamber 122.

Since the FCB dispenser 140 includes the freeze barrel 48, it also includes further structure (not shown) that is generally duplicative of the structure shown to the right of the pair of water and syrup brixing valves 102, 84, which accommodates delivery of a water and syrup mixture from the brix valves 104, 87 to the barrel 48, except that the beverage mixture does not flow through a separate pre-chiller, but instead flows through an associated beverage circuit of the prechiller 52. In addition, the line 126 at the output from the manifold third $CO_2$ pressure regulator delivers $CO_2$ to an upper opening to an expansion chamber, a lower opening from which is coupled to the inlet to the barrel 48, and to accommodate carbonating the beverage mixture delivered to the barrel 48, the outlet from a fourth $CO_2$ pressure regulator of the manifold 118 is coupled through the solenoid shut-off valve 128, the $CO_2$ orifice 130 and the $CO_2$ check valve 132 to the chilled beverage mixture intermediate the pre-chiller 52 and the inlet to the barrel 48.

Figure 5:
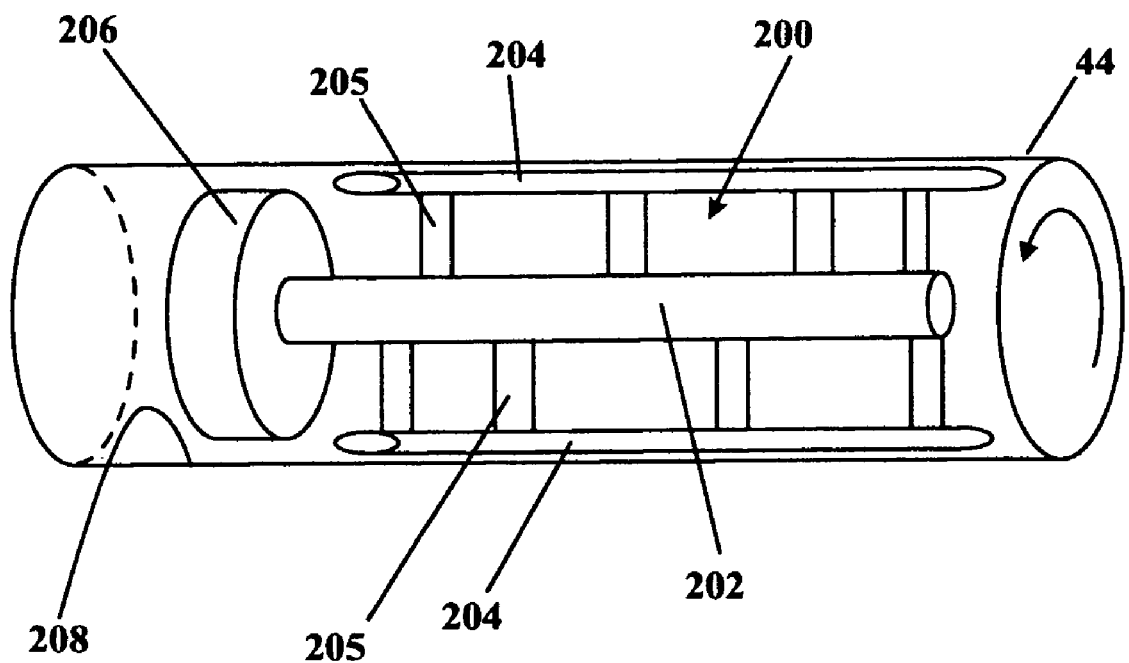
FIG. 5 shows a beater bar and scraper assembly and a drive motor for the assembly positioned within a freeze barrel.

A beater bar and scraper assembly is provided within each freeze barrel 44 and 48 of the FCB dispensers 80 and 140. Each beater bar and scraper assembly is rotated by an associated electric motor in order to scrape thin iced or frozen layers of the beverage or food product from the inner surface of its associated barrel for mixing with liquid product in the barrel to form a slush or slurry mixture in the barrel and thereby produce a frozen beverage product. One such beater bar and scraper assembly is shown in FIG. 5 and indicated generally at 200. The assembly includes a beater bar 202 and a plurality of scrapers 204 located radially outward from the beater bar. The scrapers 204 may extend generally parallel to the beater bar 202 and are attached to the beater bar by radially extending arms 205. An electric drive motor 206 has an output coupled to the beater bar 202 to rotate the beater bar and scraper assembly, and the scrapers 204 are positioned closely spaced from an inner surface 208 of the freeze barrel 44, so that upon rotation of the beater bar and scraper assembly 200, the scrapers remove or shave thin iced or frozen layers of the frozen food product from the freeze barrel inner surface. The electric drive motor 206 is shown as being located within the freeze barrel, and the motor driven beater bar and scraper assembly 200 may be of a type as taught by U.S. Pat. No. 6,163,095, the teachings of which are incorporated herein by reference. An advantage of the arrangement is that no dynamic seal is needed as compared to the situation where the beater bar extends through an end wall of the freeze barrel for connection to an electric motor that is outside of the freeze barrel. However, it is contemplated that the drive motor can be located outside of the freeze barrel, in which case a dynamic seal would be required. Although not specifically shown, it is understood that the freeze barrel 48 is also provided with an associated motor driven beater bar and scraper assembly 200.

In operation of a conventional frozen product dispenser, a beater bar and scraper assembly is rotated by a drive motor at a speed selected to be sufficiently fast to satisfy the highest drink draw rate demand. Based upon the maximum viscosity of beverage product to be produced in a barrel, i.e., based upon the thickest beverage product anticipated to be produced, the electric drive motor for the beater bar and scraper assembly is selected to have an upper output torque limit that exceeds the maximum output torque of the motor required to rotate the beater bar and scraper assembly at the selected speed in production of the thickest beverage anticipated to be produced. However, the output torque limit of the drive motor often does not significantly exceed the torque required to rotate the beater bar and scraper assembly at the selected speed in production of the thickest beverage anticipated to be produced, and it therefore can and does happen that in operation of the beater bar and scraper assembly the output torque limit of the electric drive motor is exceeded and an over-torque condition occurs. To prevent damage to the beater bar and scraper assembly drive system should an over-torque condition occur, the output torque of the drive motor is monitored, usually by using a controller to monitor the electrical power draw of the motor, which power draw is representative of and has a value in accordance with the output torque of the motor. The power draw of the motor is conveniently be monitored by sensing the current or amperage draw of the motor, and the controller uses the monitored power draw to shut down the motor and its associated freeze barrel should the power draw indicate that the motor has exceeded its output torque limit Since the output torque of the drive motor is representative of the viscosity of beverage product in the barrel and the state to which the beverage product is frozen, the controller also uses the power draw of the motor as at least one factor in controlling the refrigeration system in a manner to maintain the consistency or viscosity of product in the freeze barrel at desired levels, usually by turning the refrigeration system on and off.

If the controller senses an over-torque condition of the drive motor for the beater bar and scraper assembly, where the motor has exceeded its output torque limit, to prevent damage to the drive system the controller turns off the motor, terminates further refrigeration of the freeze barrel with which the motor is associated and generates an error condition. Generation of the error condition normally requires a service call for the frozen product dispenser, where a service technician corrects the cause of, and resets, the error condition. However, it often happens that the condition that causes a drive motor to exceed its output torque limit is transient, that the condition corrects itself before the service technician arrives, and that the condition is therefore undeterminable by the technician. In such a case, the technician can only reset the error condition of the frozen product machine to place the machine back into full operation, and the expense of a service call is unnecessarily incurred.

There are a number of situations that can cause a transient over-torque condition of the drive motor for a beater bar and scraper assembly. For example, the output torque of the drive motor can exceed its upper torque limit in response to a temporary fluctuation in the mixture of product in the barrel that affects the freeze point of the product and the amount of slush ice produced in the barrel, and thereby the viscosity of the product and the torque output of the motor. Also, in operation of the refrigeration system to chill a freeze barrel, such as in operation of the refrigeration system 20 or 72, when the power draw of the drive motor indicates that the viscosity of product in the barrel has reached a selected value, the refrigeration system is turned off while the drive motor continues to rotate the beater bar and scraper assembly in the freeze barrel. At the time the refrigeration system is turned off, it normally happens that liquid refrigerant remains in the evaporator that is heat transfer coupled to the barrel, and as this refrigerant boils off the evaporator continues to chill the freeze barrel, sometimes to the point where the viscosity of product in the barrel increases sufficiently to cause the drive motor to experience an over-torque condition. This over-torque condition is sensed and an error condition is initiated in which the drive motor and its associated freeze barrel are shut down. However, the cause of the error condition is undetectable by a service technician, since the cause is transient and the frozen product in the freeze barrel will have long since defrosted and melted before the technician arrives.

To decrease, if not eliminate, the need for unnecessary service calls resulting from transient conditions of product in a freeze barrel that cause over-torque outputs from an electric drive motor for a beater bar and scraper assembly, the invention provides a control system that automatically restores operation of a frozen product dispenser in response to occurrence of such transient conditions. In general, if the controller senses occurrence of an excess output torque from the drive motor, i.e., if the controller senses that the electric power draw of the motor has exceeded a selected maximum value, the controller initiates an automatic recovery sequence by controlling the dispenser refrigeration system to stop chilling the barrel with which the drive motor is associated, if the refrigeration system is then in a chilling cycle of that barrel, and to immediately initiate a defrost cycle of the barrel by flowing hot refrigerant gas through the evaporator heat exchange coupled to the barrel in order to defrost and melt frozen product in the barrel, thereby to relieve the load on the drive motor. The refrigeration system is maintained in the barrel defrost cycle for a period of time that is chosen to be sufficient to melt and defrost at least some of the frozen product in the barrel, thereby eliminating the condition that caused an excess torque output of the drive motor. Once the predetermined time has lapsed, the controller operates the refrigeration system to again chill and freeze product in the barrel and otherwise resume normal operation of the dispenser. The torque output of the drive motor continues to be monitored, and if the excess torque condition is again detected, the controller again initiates a defrost cycle of the freeze barrel, following which a freeze cycle is initiated until normal torque levels are restored. The control system will go through the foregoing sequence of defrosting and chilling the product freeze barrel a predetermined number of times should it continue to detect excess output torque conditions of the drive motor, before an error condition is declared and the drive motor and barrel refrigeration system are shut down pending a service call. In most cases, the condition that caused the beater bar and scraper assembly electric drive motor to develop excess output torque will cease to exist before the need arises to declare an error condition, shut down the drive motor and terminate chilling of the freeze barrel, and normal operation of the machine will be restored without loss of service and operation of the dispenser and without need for a service call.

Figure 6:
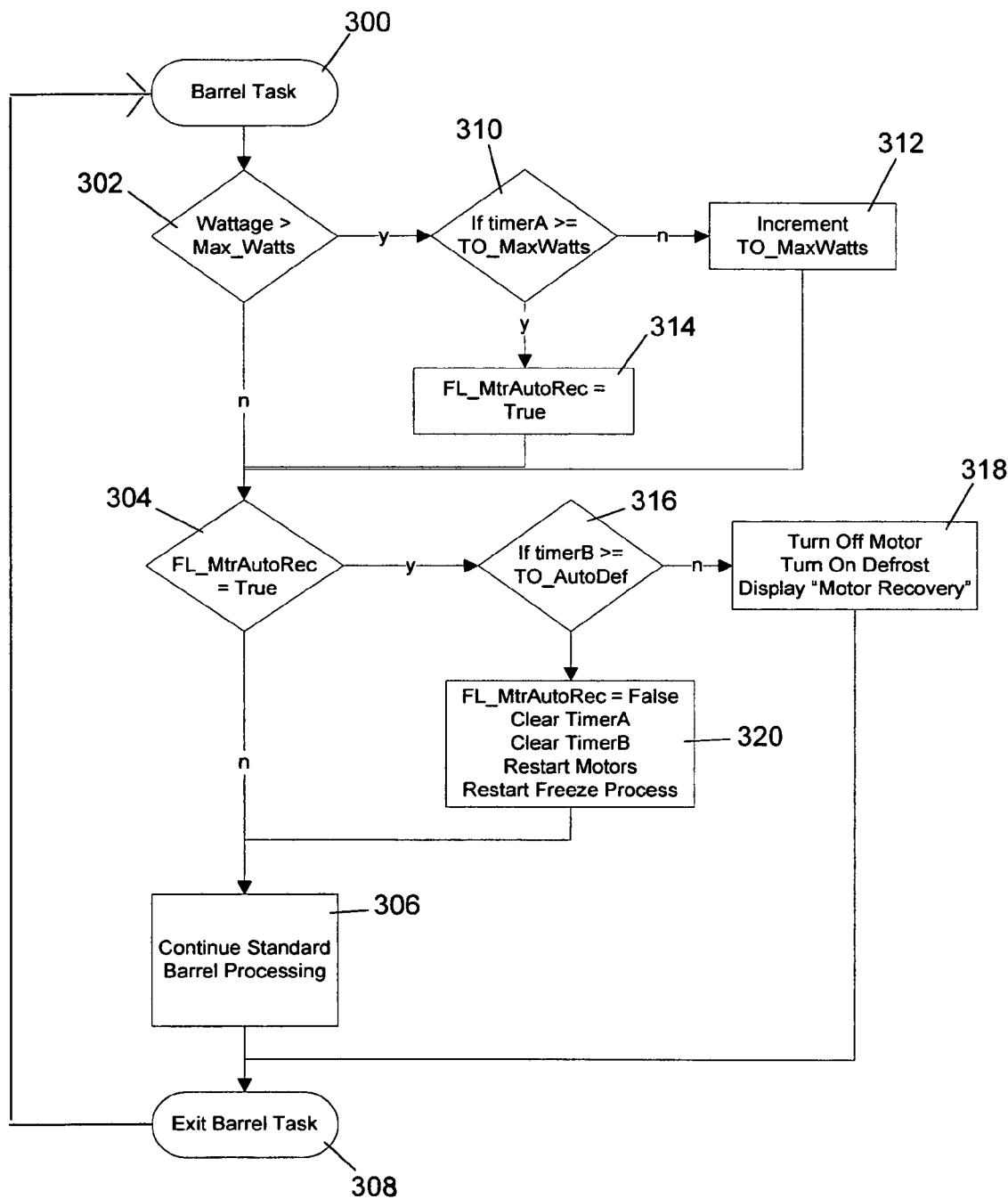
FIG. 6 is a flow chart of the operation of a frozen product dispenser embodying an automatic recovery system in accordance with the teachings of the present invention, showing operation of the automatic recovery system as occurs upon sensing an excess output torque of a drive motor for a beater bar and scraper assembly of the dispenser.

FIG. 6 is a flow chart showing one contemplated algorithm for performance by the controller to operate a frozen product dispenser in accordance with the teachings of the present invention. In performance of the algorithm, the output torque of an electric motor for a beater bar and scraper assembly of a freeze barrel of the frozen product dispenser is monitored. Should the output torque be sensed to have a value in excess of a given maximum value continuously for a selected time period, the motor is turned off and a refrigeration system is operated in a defrost cycle of the freeze barrel to at least partially defrost product in the freeze barrel. The condition causing the excess output torque often is transient and caused by overly frozen product in the freeze barrel, in which case defrosting the freeze barrel alleviates the cause of the problem. After the refrigeration system is operated in a defrost cycle for a predetermined time, it is operated in a freeze cycle to refreeze product in the freeze barrel, the beater bar and scraper assembly motor is turned on and performance of the algorithm continues to be repeated. Detection and correction of excess motor output torque are permitted to occur a determined number of times before it is considered that the cause of the condition might be mechanical and other than overly frozen product, whereupon a system error is generated.

More particularly, the algorithm is cyclically performed at set time intervals, for example four times per second or every 0.25 second, with shorter intervals being selected to provide increased sensitivity in detection of an excess torque condition of a beater bar and scraper assembly drive motor, and longer intervals being selected if less detection sensitivity is desired. With reference to FIG. 6 and beginning at a box 300 where, for example, frozen product is being produced in the freeze barrel 44 of the frozen product machine 80, at a box 302 the power input to, or the power drawn-by, the electric drive motor 206 that rotates the beater bar and scraper assembly 200 in the freeze barrel 44 is monitored. The power draw is representative of the level of work being performed by the drive motor and, therefore, of the output torque of the motor. The power draw may be expressed in terms of Wattage, which is the power draw of the motor as compensated for by motor type and incoming voltage. Since Wattage is related to the current draw of the motor by W=V×I, where W is the Wattage input to the motor, V is the voltage applied across the motor and for the purpose of performing the algorithm is considered as a constant, and I is the current draw of the motor, the current draw I can be monitored and used as an indication of the Wattage drawn by, or output torque of, the drive motor 206.

At the box 302, the sensed Wattage of the electric drive motor 206 is compared to Max_Watts, which is the Wattage drawn by the motor 206 when it develops excess output torque of a level indicating a motor stall condition. If sensed Wattage is not greater than Max_Watts, which is the case when the frozen product dispenser is operating properly, then at a box 304 it is determined if FL_MtrAutoRec=True which, as will be described, is a condition that occurs if the sensed Wattage of the drive motor has exceeded Max_Watts for a selected time, and otherwise is False. If the condition of box 304 is not True, which is the case if the drive motor has not exceeded its excess output torque limit for the selected time, then at a box 306 the frozen product machine remains enabled to continue processing of product in the freeze barrel 44 and at a box 308 the algorithm returns to the box 300 and is repeated.

On the other hand, if at the box 302 it is determined that sensed Wattage of the electric drive motor 206 is greater than Max_Watts, indicating that the drive motor is developing excess output torque and is in a stall condition, then at a box 310 TimerA is started and a determination is made whether sensed Wattage remains greater than Max_Watts for at least the selected time, i.e., for at least a timeout period TO_MaxWatts. The selected time, TO_MaxWatts, is chosen to be the time for which the sensed Wattage must exceed Max_Watts in order that it might reasonably accurately be ascertained that the electric motor has stalled and it is necessary to turn it off. It is understood however, that a minimum duration for the selected time TO_MaxWatts must be at least equal to, and usually greater than, the time for which the sensed Wattage might be expected to remain greater than Max_Watts upon initial startup of the motor 206. The selected time TO_MaxWatts is may be equal to the time duration of several cycles of performance of the algorithm. Therefore, for timerA to continue timing for the duration of the selected time period TO_MaxWatts, it is necessary that at each cycle of the algorithm to box 302 while timerA is operating, sensed Wattage be greater than Max_Watts.

Thus, if during operation of timerA at box 310 it is sensed at box 302, during a cycle of the algorithm, that Wattage no longer is greater than Max_Watts, at box 310 a determination is made that Wattage did not remain greater than Max_Watts for at least the selected time TO_MaxWatts. Under this circumstance, at a box 312 timerA is reset and there is a return to box 304 and, since the condition of box 304 has not been satisfied, the algorithm proceeds through boxes 306 and 308 and returns to box 300 and is repeated.

On the other hand, if for the duration of operation of timerA it is sensed at box 302, during each cycle of the algorithm, that Wattage is greater than Max_Watts, then at box 310 a determination is made that Wattage has remained greater than Max_Watts for at least the selected time TO_MaxWatts. This indicates that the drive motor 206 has stalled, and at a box 314 FL_MtrAutoRec equals True, which sets a flag at box 304 to indicate that the condition of box 304 has been satisfied. With the condition at box 304 satisfied, at a box 316 timerB is started and a determination is made whether the time accrued by timerB is greater than a time TO_AutoDef, where TO_AutoDef is the predetermined time for which it is desired to operate the refrigeration system in a defrost cycle of the freeze barrel 44 upon the sensed Wattage of the motor 206 exceeding Max_Watts for the selected time TO_MaxWatts. At this point, since an excess motor output torque has just initially been detected, the refrigeration system would not have been in a defrost cycle of the freeze barrel for at least the predetermined time TO_AutoDef, and the condition of box 316 would not be satisfied. Therefore, at a box 318 the beater bar and scraper assembly drive motor 206 is turned off, operation of the refrigeration system in a defrost cycle of the freeze barrel 44 is initiated, and a visible indication is generated to inform a user of the frozen product machine that a "Motor Recovery" is occurring. The algorithm then continues to cycle through boxes 308, 300, 302, 304, 316 and 318 until, at box 316, timerB has operated for at least the predetermined time TO_AutoDef, whereupon at a box 320 the flag at box 304 is set to False, TimerA and TimerB are cleared and set to zero, the beater bar and scraper assembly motor 206 is restarted, and operation of the refrigeration system in a freeze cycle of the freeze barrel is initiated.

The algorithm is then repeated as above described until a pre-selected number of motor stall conditions and attendant frozen product machine recoveries are performed and detected at box 318, at which point it is considered that the motor stall conditions are being cause by a malfunction of the frozen product machine that requires a service call by a technician, at which point the machine is turned off and a system error is generated.

It is to be appreciated that while the invention has been described in terms of its use in connection with a machine for making frozen product that comprises a mixture of a beverage syrup and diluent for the syrup, the invention could just as readily be used with a machine for making other types of frozen products, such as products comprising orange juice, grapefruit juice, ice cream, etc.

While embodiments of the invention have been described in detail, various modifications and other embodiments thereof may be devised by one skilled in the art without departing from the spirit and scope of the invention, as defined in the appended claims.

What is claimed is:
1. A frozen product machine, comprising:
a freeze barrel;
a refrigeration system operable in a chilling cycle to freeze product in said freeze barrel and in a defrost cycle to defrost product in said freeze barrel;
a scraper in said freeze barrel;
an electric motor for rotating said scraper in said freeze barrel;
means for sensing the output torque of said motor;
first means for interrupting a chilling cycle of said refrigeration system in response to sensing an output torque of said motor that is at least equal to a predetermined torque;
second means for turning off said motor and for operating said refrigeration system in a defrost cycle in response to sensing an output torque of said motor that is at least equal to a selected torque, said selected torque being greater than said predetermined torque; and
means, responsive to completion of said defrost cycle of said refrigeration system for turning on said motor and operating said refrigeration system in a chilling cycle to refreeze product in said freeze barrel.

2. The frozen product machine as in claim 1, wherein said second means is responsive to sensing an output torque of said motor that remains at least equal to said selected torque for at least a selected time to turn off said motor and operate said refrigeration system in a defrost cycle.

3. The frozen product machine as in claim 1, wherein said means for turning on said motor and operating said refrigeration system in a chilling cycle is responsive to operation of said refrigeration system in a defrost cycle for a predetermined time to turn on said motor and operate said refrigeration system in a chilling cycle.

4. The frozen product machine as in claim 1, wherein said second means is responsive to said sensing means sensing occurrence of an output torque of said motor that is at least equal to said selected torque at least two times before turning off said frozen product machine.

5. A frozen product machine, comprising:
a freeze barrel;
a refrigeration system operable in a chilling cycle to freeze product in said freeze barrel and in a defrost cycle to defrost product in said freeze barrel;
a scraper in said freeze barrel;
an electric motor for rotating said scraper in said freeze barrel;
means for sensing the output torque of said motor;
first means for interrupting a chilling cycle of said refrigeration system in response to sensing an output torque of said motor that is at least equal to a predetermined torque;
second means for turning off said motor and for operating said refrigeration system in a defrost cycle in response to sensing an output torque of said motor that is and remains at least equal to a selected torque for at least a selected time, said selected torque being greater than said predetermined torque; and
means responsive to said refrigeration system being operated in a defrost cycle for a predetermined time to turn on said motor and operate said refrigeration system in a chilling cycle.

6. The frozen product machine as in claim 5, wherein said means for sensing the output torque of said electric motor includes means for sensing the electrical power input to said motor.

7. The frozen product machine as in claim 5, wherein said means for sensing the output torque of said electric motor includes means for sensing the current draw of said motor.

8. The frozen product machine as in claim 5, wherein:
said means for sensing the output torque of said electric motor periodically senses the output torque; and
said second means is responsive to said sensed torque being and remaining at least equal to said selected torque for said selected time at each periodic sensing of said output torque to turn off said motor and operate said refrigeration system in a defrost cycle.

9. The frozen product machine as in claim 5, including counter means for counting the number of occurrences of said sensed torque being and remaining at least equal to said selected torque limit for at least said selected time, and means responsive to said counter means reaching a determined count greater than one for turning off said frozen product machine.

10. A method of operating a frozen product dispenser having a refrigeration system operable in chilling and defrost cycles to respectively freeze and defrost product in a freeze barrel, a scraper in the freeze barrel, and an electric motor for rotating the scraper in the freeze barrel, said method comprising the steps of:

sensing the output torque of the electric motor;

in response to sensing an output torque of the motor that is at least equal to a predetermined torque, interrupting any then ongoing chilling cycle of the refrigeration system;

in response to sensing an output torque of the motor that is at least equal to a selected torque that is greater than the predetermined torque, interrupting operation of the motor to terminate rotation of the scraper in the freeze barrel and operating the refrigeration system in a defrost cycle to defrost product in the freeze barrel; and upon completion of the defrost cycle, turning on the motor and operating the refrigeration system in a chilling cycle to refreeze product in the freeze barrel.

11. The method as in claim 10, wherein said step of turning off the motor and operating the refrigeration system in a defrost cycle is responsive to said sensing step sensing an output torque of the motor that is and remains at least equal to the selected torque for a selected time to turn off the motor and operate the refrigeration system in a defrost cycle.

12. The method as in claim 10, wherein said step of turning on the motor and operating the refrigeration system in a chilling cycle upon completion of the defrost cycle is responsive to occurrence of the defrost cycle for at least a predetermined time to turn on the motor and operate the refrigeration system in a chilling cycle.

13. The method as in claim 10, including the step of turning off the frozen product machine in responsive to said sensing step sensing for a determined number of times greater than one an output torque of the motor that is at least equal to the selected torque.

14. A method of operating a frozen product dispenser having a refrigeration system operable in chilling and defrost cycles to respectively freeze and defrost product in a freeze barrel, a scraper in the freeze barrel, and an electric motor for rotating the scraper in the freeze barrel, said method comprising the steps of:

sensing the output torque of the electric motor;

comparing the sensed motor output torque to predetermined and selected torques, the selected torque being greater than the predetermined torque;

upon the sensed motor output torque being at least equal to the predetermined torque, interrupting any then ongoing chilling cycle of the refrigeration system;

determining whether the sensed motor output torque is and remains at least equal to the selected torque for at least a selected time;

upon determining that the sensed motor output torque has continuously been at least equal to the selected torque for at least the selected time, turning off the electric motor and operating the refrigeration system in a defrost cycle; and upon the refrigeration system being operated in the defrost cycle for a predetermined time, turning on the electric motor and operating the refrigeration system in a chilling cycle.

15. The method as in claim 14, wherein said step of sensing the output torque of the electric motor includes the step of sensing the electrical power input to the motor.

16. The method as in claim 14, wherein said step of sensing the output torque of the electric motor includes the step of sensing the current draw of the motor.

17. The method as in claim 14, wherein:
   said comparing step is performed periodically; and
   said step of turning off the electric motor and operating the refrigeration system in a defrost cycle is responsive to the motor output torque being at least equal to the selected torque continuously for the selected time during at least one periodic performance of said sensing and comparing steps.

18. The method as in claim 14, including the steps of:
   counting the number of performances of said determining step determining that the sensed motor output torque is at least equal to the selected torque for at least the selected time; and
   turning off the frozen product machine in response to said counting step reaching a determined count that is greater than one.

* * * * *